(12) United States Patent
Min et al.

(10) Patent No.: US 6,587,632 B2
(45) Date of Patent: Jul. 1, 2003

(54) THERMO-OPTIC TUNABLE OPTICAL ATTENUATOR

(75) Inventors: Yoo-Hong Min, Taejon (KR); Myung-Hyun Lee, Taejon (KR); Jung-Jin Ju, Taejon (KR); Seung-Koo Park, Taejon (KR); Jung-Yun Do, Taejon (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 09/855,478

(22) Filed: May 14, 2001

(65) Prior Publication Data

US 2002/0081089 A1 Jun. 27, 2002

(30) Foreign Application Priority Data

Dec. 22, 2000 (KR) .......................... 2000-80595

(51) Int. Cl.$^7$ ................................. G02B 6/10
(52) U.S. Cl. ..................... 385/140; 385/45; 385/1; 385/2; 385/3
(58) Field of Search .................. 385/45, 140, 2, 385/3, 8, 10

(56) References Cited

U.S. PATENT DOCUMENTS 5,502,780 A  * 3/1996  Rangaraj ...................... 385/2
5,696,855 A  * 12/1997  Skeie ............................ 385/2
5,841,568 A  * 11/1998  Miyakawa ................... 359/245
5,917,974 A  *  6/1999  Tavlykaev et al. ............. 385/39
6,181,456 B1 *  1/2001  McBrien et al. ............. 359/245
6,320,692 B1 * 11/2001  Notargiacomo ............. 359/239

OTHER PUBLICATIONS

IEEE Photonics Technology Letter, vol. 12, No. 4, Apr. 2000, pp. 407–409.

IEEE Photonics Technology Letters, vol. 11, No. 5, May 1999, pp. 590–592.

* cited by examiner

Primary Examiner—Robert H. Kim
Assistant Examiner—Richard Kim
(74) Attorney, Agent, or Firm—Blakely, Sokoloff Taylor & Zafman

(57) ABSTRACT

Disclosed is a thermo-optic tunable attenuator, which comprises a single mode channel optical waveguide, an optical waveguide of a Mach-Zehnder interferometer structure coupled with the single mode channel optical waveguide, the optical waveguide including two symmetric Y-branches, and two metal heating wires for applying power to one side of each of the two symmetric Y-branches, wherein the two metal heating wires are in a facing relationship with each other, wherein a refractive index of the optical waveguide is changed in response to a power applied to any one of the two metal heating wires.

6 Claims, 4 Drawing Sheets

THERMO-OPTIC TUNABLE OPTICAL ATTENUATOR

FIELD OF THE INVENTION

The present invention relates to an integrated optical technology; and, more particularly, to a thermo-optic tunable attenuator has a wide range of light attenuation region, a linear operating characteristic and a polarization independence characteristic for an input electrical signal, and the ability to operate at a speed of milliseconds.

DESCRIPTION OF THE PRIOR ART

In general, an optical attenuator serves to attenuate an intensity of an input optical signal and a tunable attenuator serves to control a degree that the optical signal is attenuated in an electrical and mechanical manner.

A conventional tunable attenuator includes an opto-mechanical optical attenuator, an optical attenuator using a micro electro mechanical system (MEMS) and a thermo-optic optical waveguide type of optical attenuator.

The opto-mechanical optical attenuator utilizes a technique which spaces two optical fibers at a small interval from one another and mechanically moves a variable absorption filter or a shielding film over the interval, to thereby absorb or shut off a portion of incident light, or a technique which collocates two side-polished optical fibers with each other and controls an interval therebetween, to thereby adjust an intensity of light to be transmitted through. Although, however, the opto-mechanical optical attenuator may have extremely good characteristics including an optical attenuation range higher than 50 dB, a reduced insertion loss and a linearity of 0.1 dB, it suffers from a drawback that it requires numerous bulky discrete components to decrease the operational speed on a second basis.

In addition to an excellent operation characteristic of the opto-mechanical optical attenuator, the MEMS based optical attenuator also has merits including an increased operation speed of microseconds and a reduced operation power. Unfortunately, the MEMS based optical attenuator suffers from a drawback that it is difficult to integrate with another optical waveguide device.

The thermo-optic optical waveguide type of optical attenuator is implemented through the use of operation characteristics of a thermo-optic modulator or thermo-optic switch, which may be used in an integrated optical circuit. The thermo-optic tunable attenuator using silica or polymer has been published, which can precisely control an optical attenuation degree in an operation speed of milliseconds, a polarization independence and powers less than several hundreds mW.

In practice, as the opto-mechanical optical attenuator and the MEMS based optical attenuator, an optical attenuator using an asymmetric Y-branch optical switch has a digital-like operational characteristic in which the optical attenuation degree is continuously decreased with an external drive signal to reach to a saturation state, extends the optical attenuation degree over 30 dB, and increases a degree of fault tolerance to facilitate fabrication processes. For this reason, studies of the optical attenuator using the asymmetric Y-branch optical switch are actively in progress.

In FIG. 1, a schematic pictorial view of a conventional tunable attenuator using a thermo-optic device is illustrated. As shown in FIG. 1, the conventional tunable attenuator includes an optical modulator having an asymmetric Y-branch waveguide 11 and a drive electrode 12 for applying a power, a main output port 13 for outputting an attenuated output from the optical modulator, a monitor port 14 for extracting a portion of the main output port 13 to monitor extracted results, and a dummy drain port 15, which is branched from the asymmetric Y-branch waveguide 11 in a curve shape, for removing a portion of input optical power. The conventional tunable attenuator has been published in the following paper: "Polymeric Tunable Attenuator with an Optical Monitoring Tap for WDM Transmission Network", IEEE Photonics Technology Letters, Vol. 11, No.5, p590, May 1999, Sang-shin Lee, et.al.

As mentioned above, the conventional optical attenuator including the asymmetric Y-branch waveguide 11 and the drive electrode 12 attenuates an intensity of output light beam responsive to an applied power using a mode evolution scheme and feeds back a portion of output light beam to thereby stabilize the output light beam.

However, the conventional thermo-optic tunable attenuator suffers from a drawback that since a change in optical attenuation degree for an applied power is non-linear, it causes a considerable amount of power consumption at an initial change in the optical attenuation degree, thereby adversely affecting the energy efficiency of the tunable attenuator.

SUMMARY OF THE INVENTION

It is, therefore, a primary object of the present invention to provide a thermo-optic tunable attenuator which is capable of preventing a considerable amount of power consumption due to a non-linear change in optical attenuation degree for a power applied externally, to thereby achieve a high linearity, a wide range of optical attenuation region higher than 35 dB, an operation speed of milliseconds, a polarization independence and be configured for use in an integrated optical circuit.

In accordance with a preferred embodiment of the present invention, there is provided a thermo-optic tunable attenuator, which comprises a single mode channel optical waveguide; an optical waveguide of a Mach-Zehnder interferometer structure coupled with the single mode channel optical waveguide, the optical waveguide including two symmetric Y-branches; and two metal heating wires for applying power to one side of each of the two symmetric Y-branches, wherein the two metal heating wires are in a facing relationship with each other, wherein a refractive index of the optical waveguide is changed in response to a power applied to any one of the two metal heating wires.

Preferably, the thermo-optic tunable attenuator further comprises a first metal electrode for connecting the two metal heating wires in a series fashion; and a pair of second metal electrodes, each of which being connected to a corresponding one in the metal heating wires, for applying the power to the metal heating wires.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Figure 1:
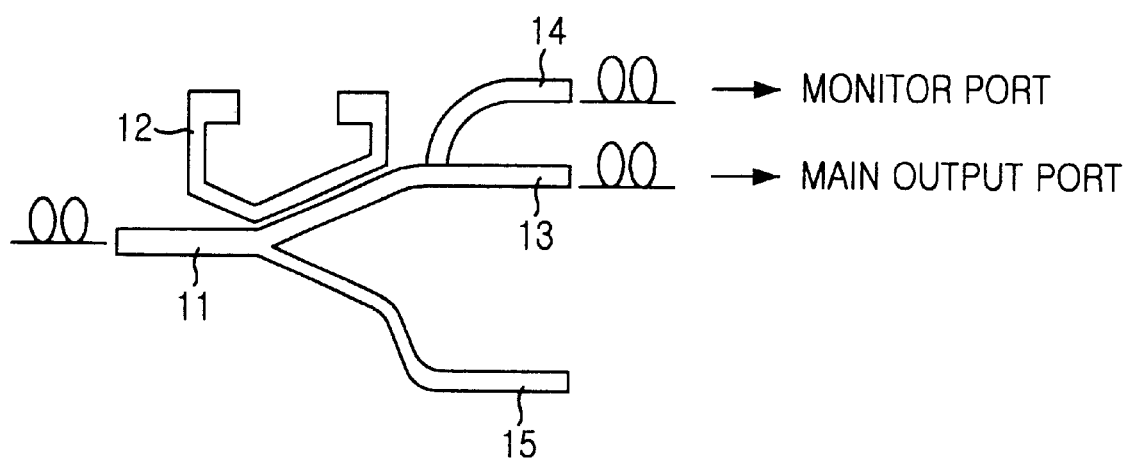
FIG. 1 illustrates a schematic pictorial view of a conventional tunable attenuator using a thermo-optic device.
Figure 2:
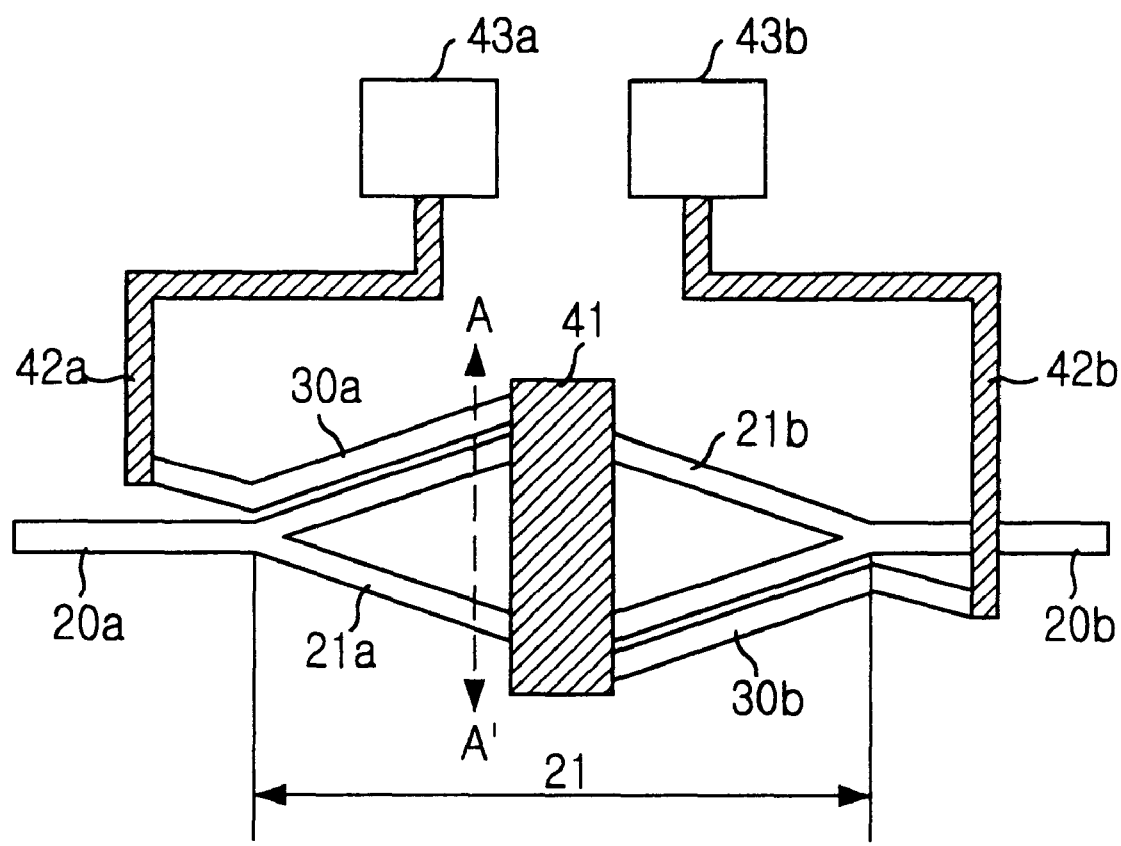
FIG. 2 shows a schematic pictorial view of a thermo-optic tunable attenuator with optical waveguides of a Mach-Zehnder interferometer structure and metal heating wires, in accordance with a preferred embodiment of the present invention.

FIG. 2 is a schematic pictorial view of a thermo-optic tunable attenuator with optical waveguides of a Mach-Zehnder interferometer structure and metal heating wires, in accordance with a preferred embodiment of the present invention.

As shown in FIG. 2, the thermo-optic tunable attenuator of the present invention comprises two single mode channel optical waveguides 20a and 20b for coupling a signal incident thereto from an optical fiber in a single mode; an optical waveguide 21 with the Mach-Zehnder interferometer structure, which includes two symmetric Y-branches 21a and 21b for branching output signals outputted from the single mode channel optical waveguides 20a and 20b into two light beam respectively; two metal heating wires including a first metal heating wire 30a and a second metal heating wire 30b for changing a refractive index of the optical waveguide 21; a first metal electrode 41 positioned at the center of the optical waveguide 21 for connecting the two metal heating wires 30a and 30b in a series fashion to apply a power; a pair of second metal electrodes 42a and 42b each of which is connected to a corresponding one in the metal heating wires 30a and 30b for applying the power; and two electrode pads 43a and 43b. The first metal heating wire 30a is disposed on one side of the symmetric Y-branch 21a and the second metal heating wire 30b is disposed on one side of the symmetric Y-branch 21b.

In this case, a splitting angle in each of the symmetric Y-branches 21a and 21b ranges from 0.05 to 0.5 degree, a length of transition region that connects between the symmetric Y-branches 21a and 21b in the optical waveguide 21 ranges from 10 $\mu$m to 50 $\mu$m and a distance between the symmetric Y-branches 21a and 21b in the optical waveguide 21 ranges 15 $\mu$m to 30 $\mu$m.

In addition, the length of the transition region is higher than a width of the first metal electrode 41. An excessively increased length of the transition region causes a phase difference between the two waveguides and therefore it is necessary to adequately set the length of the transition region.

On the one side, a decreased distance between the symmetric Y-branches 21a and 21b causes a mutual interference of light between the two waveguides and an increased distance between the symmetric Y-branches 21a and 21b causes the overall length of device to be prolonged. Accordingly, it is necessary to adequately maintain the distance between the symmetric Y-branches 21a and 21b.

The two metal heating wires 30a and 30b are in a facing relationship with each other and the single mode channel optical waveguides 20a and 20b are coupled with an optical input terminal and an optical output terminal, respectively.

Figure 3:
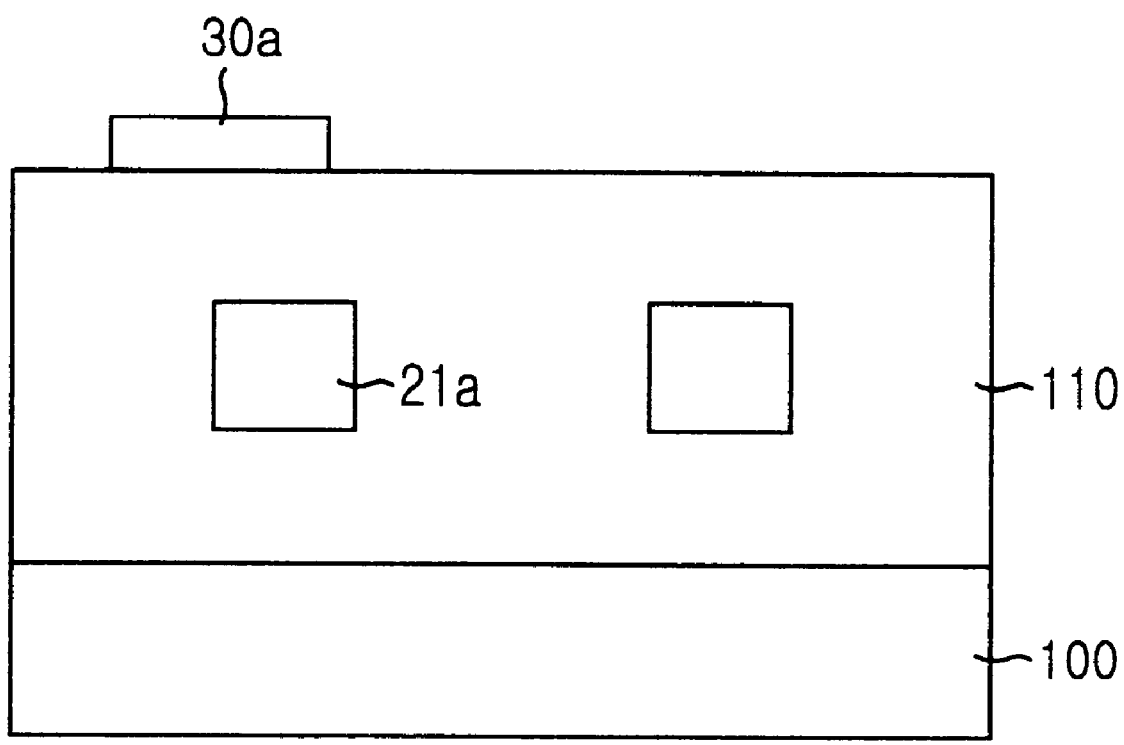
FIG. 3 exhibits a sectional view taken on line A–A' in FIG. 2.

FIG. 3 is a sectional view taken on line A–A' in FIG. 2. In FIG. 3, formed on a silicon wafer 100 is a cladding layer 110, which contains the optical waveguide 21 with the Mach-Zehnder interferometer structure. The metal heating wires 30a and 30b are disposed on top of the cladding layer 110 to apply heat thereto. The metal heating wires 30a and 30b is formed by coating an wire with a gold-based electrode of 0.3 to 1 $\mu$m in thickness through the use of a gold plating. Performing a reactive ion etching (RIE) on a multi-layer polymer thin film formed by a spin coating method forms the optical waveguide 21 with the Mach-Zehnder interferometer structure.

The first metal electrode 41, the pair of second metal electrodes 42a and 42b, and the electrode pads 43a and 43b, which apply the power to the metal heating wires 30a and 30b, are formed in a thickness of 3 $\mu$m in an identical manner as for the metal heating wires 30a and 30b.

As mentioned above, the thermo-optic tunable attenuator of the present invention utilizes the mode evolution scheme in the symmetric Y-branches 21a and 21b. The mode evolution scheme means that the application of heat to a first waveguide causes an elevated temperature, inducing a refractive index difference between the first waveguide and the other waveguide, to thereby set light toward one with a higher refractive index.

That is to say, when no voltage is applied the two symmetric Y-branches 21a and 21b, incident light beam is divided to two portions, wherein the application of power to any one of the metal heating wires 30a and 30b elevates a temperature of the corresponding metal heating wire, to thereby decrease a refractive index of the optical waveguide which positions at the corresponding metal heating wire. The decrease of the refractive index allows light to be outputted through the other waveguide of a higher value of refractive index.

As mentioned above, an elevated temperature allows an intensity of light which passes through a waveguide with a smaller value of refractive index to be continuously decreased, thereby showing an operation characteristic approaching to the saturation state when a temperature at which the mode evolution scheme is collapsed is reached.

When the two symmetric Y-branches 21a and 21b are connected in series, it is possible to implement the optical attenuator with an operation characteristic that shows a linear decrease in optical attenuation degree with an applied power.

Figure 4:
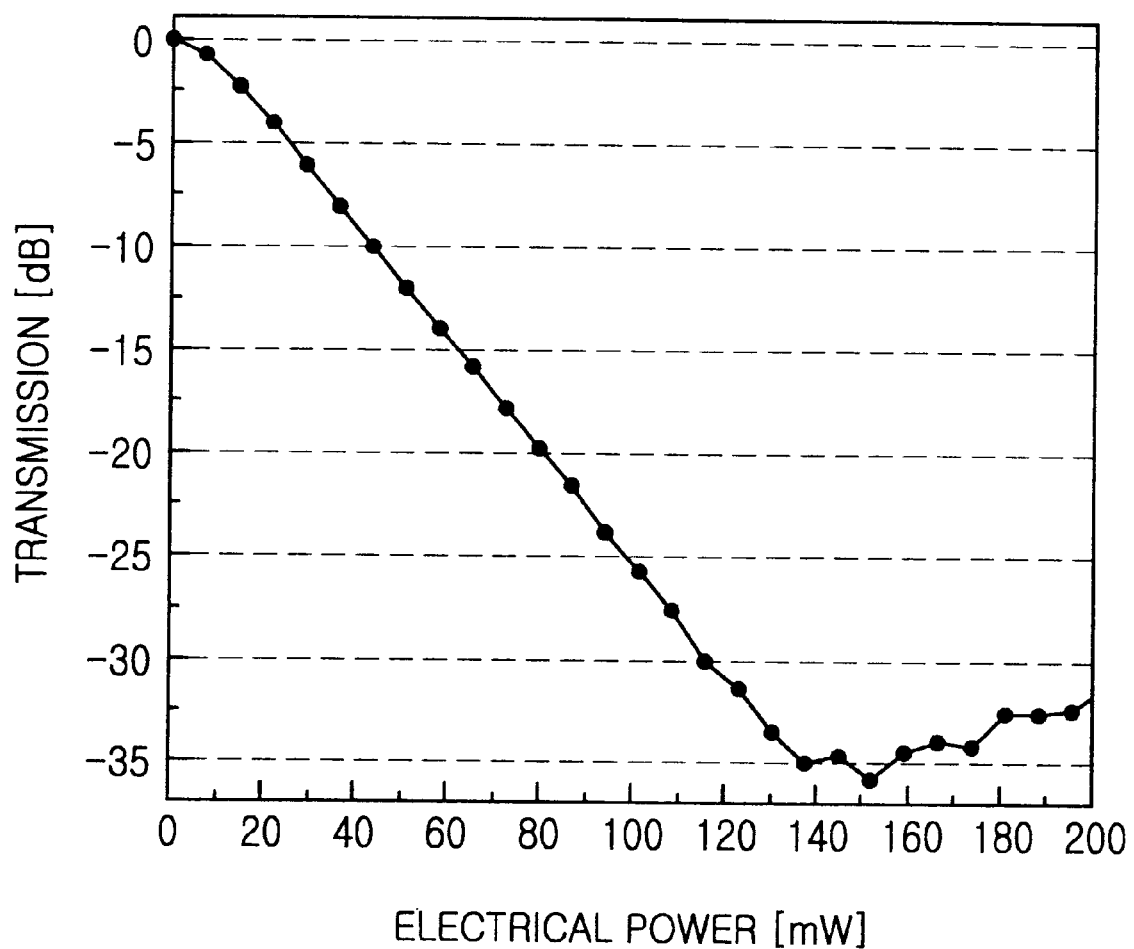
FIG. 4 provides a graphical representation of results obtained by simulating a change in optical attenuation degree with an applied power in the afore-mentioned thermo-optic optical attenuator.

FIG. 4 is a graphical representation of results obtained by simulating a change in optical attenuation degree with an applied power in the afore-mentioned thermo-optic optical attenuator. In the simulation, a splitting angle of the Y-branch is set to be 0.1 degree, a refractive index difference between the optical waveguide 21 and the cladding layer 110 is set to be 0.6%, a thermo-optic coefficient of material is set to be $-0.00012 K^{-1}$ and a distance between the two waveguides at the center of the Mach-Zehnder interferometer is set to be 20 $\mu$m.

As shown in FIG. 4, the simulation has shown that when an operation region of the optical attenuator is 35 dB, the optical attenuation degree is linearly changed responsive to an increased applied power within an interval between 2 dB and 35 dB. On the one side, it is possible to achieve an optical attenuation degree higher than 35 dB by optimizing the splitting angle of the symmetric Y-branch and the distance between the two waveguides at the center of the Mach-Zehnder interferometer.

As demonstrated above, the thermo-optic tunable attenuator of the present invention provides an optical attenuation region higher than at least 35 dB and allows a change in optical attenuation degree with an applied power to be linear, to thereby making it possible to enhance the energy efficiency of the tunable attenuator.

Furthermore, the thermo-optic tunable attenuator of the present invention has the ability to operate at a speed of milliseconds and implement a polarization independence characteristic.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A thermo-optic tunable attenuator, comprising:

a single mode channel optical waveguide;

an optical waveguide of a Mach-Zehnder interferometer structure coupled with the single mode channel optical waveguide, the optical waveguide including two symmetric Y-branches which are connected to each other through a transition region; and a first metal heating wire and a second metal heating wire connected through a first metal electrode positioned at a center of the transition region in a series fashion, the first metal heating wire disposed on one side of one of said two symmetric Y-branches in a facing relationship with the second metal heating wire disposed on one side of the other symmetric Y-branch, to apply power to one side of each of the two symmetric Y-branches, wherein a refractive index of the optical waveguide is changed in response to a power applied to any one of the two metal heating wires.

2. The thermo-optic tunable attenuator of claim 1, wherein a splitting angle in each of the two symmetric Y-branches is in the range from 0.05 to 0.5 degree.

3. The thermo-optic tunable attenuator of claim 1, wherein a length of the transition region that connects between the two symmetric Y-branches in the optical waveguide is in the range from 10 $\mu$m to 50 $\mu$m, and a distance between the two symmetric Y-branches in the optical waveguide is in the range from 15 $\mu$m to 30 $\mu$m.

4. The thermo-optic tunable attenuator of claim 1, wherein the two symmetric Y-branches have the same length, thickness and width.

5. The thermo-optic tunable attenuator of claim 1, further comprising:

a pair of second metal electrodes, each of which being connected to a corresponding one in the metal heating wires, for applying the power to the metal heating wires.

6. The thermo-optic tunable attenuator of claim 1, wherein the metal heating wires is formed by coating an wire with a gold-based electrode of 0.3 to 1 $\mu$m in thickness through the use of a gold plating.

* * * * *